United States Patent
Kanevsky et al.

(10) Patent No.: US 8,054,986 B2
(45) Date of Patent: Nov. 8, 2011

(54) METHOD AND APPARATUS FOR COMPUTER COMMUNICATION USING AUDIO SIGNALS

(75) Inventors: Dimitri Kanevsky, Ossining, NY (US);
Ran D. Zilca, Briarcliff Manor, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/543,306

(22) Filed: Aug. 18, 2009

(65) Prior Publication Data
US 2009/0315687 A1 Dec. 24, 2009

Related U.S. Application Data

(62) Division of application No. 10/650,878, filed on Aug. 29, 2003, now Pat. No. 7,706,548.

(51) Int. Cl.
*H04B 3/00* (2006.01)

(52) U.S. Cl. .................... 381/77; 340/384.5; 340/384.4; 714/4.1; 714/13

(58) Field of Classification Search ............. 714/4, 6, 714/13, 47, 4.1; 340/384.4, 384.5, 902; 700/94; 381/77
See application file for complete search history.

(56) References Cited

U.S. PATENT DOCUMENTS

| | | | | |
|---|---|---|---|---|
| 5,566,339 A | * | 10/1996 | Perholtz et al. | 713/340 |
| 5,581,800 A | * | 12/1996 | Fardeau et al. | 455/2.01 |
| 6,044,444 A | * | 3/2000 | Ofek | 711/162 |
| 6,362,749 B1 | * | 3/2002 | Brill | 340/902 |
| 6,496,949 B1 | * | 12/2002 | Kanevsky et al. | 714/47 |
| 7,260,221 B1 | * | 8/2007 | Atsmon | 380/247 |
| 7,706,548 B2 | * | 4/2010 | Kanevsky et al. | 381/77 |
| 2001/0038344 A1 | * | 11/2001 | Garcia | 340/902 |

* cited by examiner

*Primary Examiner* — Xu Mei
(74) *Attorney, Agent, or Firm* — Tutunjian & Bitetto, P.C.; Anne V. Dougherty, Esq.

(57) ABSTRACT

An acoustic communication device includes a computer device having an acoustic transmitter and/or an acoustic receiver. A signal processing module processes sound signals such that the transmitter and/or receiver are employed to permit acoustic communication between computer devices using sound signals.

6 Claims, 3 Drawing Sheets

METHOD AND APPARATUS FOR COMPUTER COMMUNICATION USING AUDIO SIGNALS

RELATED APPLICATION INFORMATION

This application is a Divisional application of U.S. patent application Ser. No. 10/650,878 filed on Aug. 29, 2003, now U.S. Pat. No. 7,706,548 incorporated herein by reference in its entirety.

BACKGROUND

1. Field of the Present Disclosure

The present disclosure relates computer communication, and more particularly to short range and peer-to-peer communication with computers using acoustic signals.

2. Description of the Related Art

Computer communication is obtained by converting digital data to a physical signal, and transmitting the signal over a channel, for example, infrared over air, radio frequency over air, light signal over fiber, electrical voltage over copper wire, etc. Depending on the properties of the signal and the channel, different properties and restrictions apply. For example, infrared and light signals are uni-directional and thus require a Line Of Sight (LOS) between the transmitter and the receiver.

Wireless radio communication does not typically require a line of sight between transmitter and receiver. However, wireless computer communication requires wireless transmitters and receivers along with associated antennae and other hardware in order to establish and maintain communication therebetween. Wireless communication further relies on radio frequency modulation and may be overkill for short-range communications.

SUMMARY

An acoustic communication device includes a computer device having an acoustic transmitter and/or an acoustic receiver. A signal-processing module processes sound signals such that the transmitter and/or receiver are employed to permit acoustic communication between computer devices using sound signals.

A device network includes a plurality of computers. Each computer includes a signal-processing module for processing sound signals such that an ambient environment surrounding the computers is employed to propagate compression waves to acoustically communicate between the computers using sound signals.

A method for communicating between computer devices, includes providing a computer device including at least one of an acoustic transmitter and a receiver. A signal-processing module processes sound signals. Acoustic vibrations are transmitted. When they are received, the acoustic vibrations are translated such that the transmitter and receiver are employed to permit acoustic communication between computer devices using sound signals.

A method for acoustically communicating between computer devices to provide back-up services, includes the steps of providing a computer device including at least an acoustic receiver, and a signal-processing module for processing sound signals, receiving information acoustically from at least one other computer device and recording the information to provide a back-up service.

An alert system includes a siren, which acoustically transmits encoded digital information when activated. The siren is disposed at an arbitrary location, and may be fixed or portable. The digital information is received by one or more distributed computer devices within an audible range of the siren to determine a message provided in the encoded digital information.

These and other objects, features and advantages of the present disclosure will become apparent from the following detailed description of illustrative embodiments thereof, which is to be read in connection with the accompanying drawings.

BRIEF DESCRIPTION OF DRAWINGS

The exemplary embodiments will be described in detail in the following description of preferred embodiments with reference to the following figures wherein.

DETAILED DESCRIPTION OF PREFERRED EMBODIMENTS

A short-range computer communication solution that is implemented using software without the need for complex or specialized hardware is disclosed. That is, the present exemplary system may not require any additional hardware other than standard hardware for both peers (transmitter and receiver). Further exemplary advantages can be achieved by providing a mobile system where computer systems could communicate with other unfamiliar computer systems instantaneously using audio communication.

Most computers currently include an audio system that permits receiving of audio information and digitizing the information. Computers are also capable of playing digitized audio through a loudspeaker. When audio is acquired, the sound pressure waves traveling through media, such as air or water, are converted into digital voltages in a transducer such as a microphone.

In a computer system that includes audio hardware, the resulting voltage signal is digitized into a binary data format. When audio needs to be played by a computer, the digital format of the audio signal is converted into voltages that are applied to a transmitter or loudspeaker. The loudspeaker converts the voltage into a pressure wave, known as audio or sound.

The exemplary embodiments of the present disclosure use the existing sound hardware in computers to establish a communication channel over the air (or underwater, if applicable). The transmitter computer will modulate a digital signal using the digital data to be transmitted and play them using its loudspeaker, and the receiver computer will use its microphone to acquire the audio signal and demodulate it to retrieve the originally transmitted digital data. Since the sound signal is omni-directional several different computers may intercept the transmitted audio and interpret it, permitting a broadcast mode.

In addition, computer audio communication can be used to create an ad-hoc computer network, when some computers propagate the audio signal (e.g., play back the intercepted audio without processing it), acting as transceivers and expanding an effective transmission range. These computers may also be used in a wider range by including transceiver computers or separate transceiver devices that will propagate the audio signal.

It should be understood that the elements shown in the FIGS. may be implemented in various forms of hardware, software or combinations thereof. Preferably, these elements are implemented in a combination of hardware and software on one or more appropriately programmed general-purpose digital computers having a processor and memory and input/output interfaces.

Figure 1:
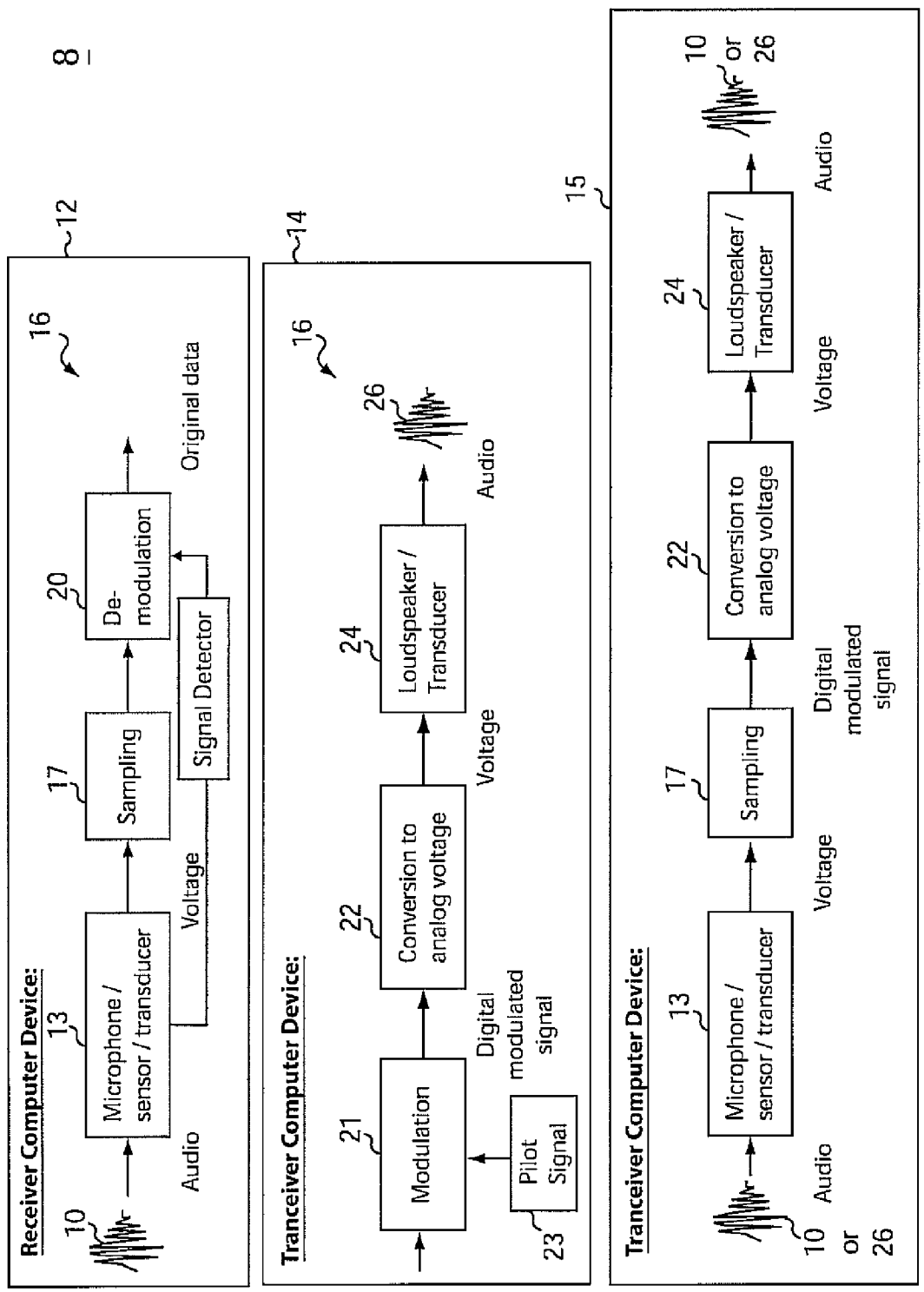
FIG. 1 is a block diagram showing a receiver computer device, a transmitter computer device and a transceiver computer device in accordance with the present disclosure.

Referring now to the drawings in which like numerals represent the same or similar elements and initially to FIG. 1, a block/flow diagram depicts three computer devices for a communication system. A receiver computer device 12 includes a receiver 13 which may include a transducer such as a microphone or sensor. Computer 12 may be part of a communication system 8 and may include one or more is computer devices (e.g., system 8 may include one or more of computers 12, 14, and 15). Computer devices 12, 14 and 15 in this example, may include personal computers, laptops, personal digital assistants, cellular telephones, beepers or any other device capable of generating and/or receiving acoustic energy and processing the acoustic energy to decipher data. Transceiver 15 may be a stand-alone device that is not a computer, but merely a repeater to propagate sound signals.

Each computer (12 and 14) includes a signal-processing module 16 for processing sound signals such that the transmitter and/or receiver are employed to permit acoustic communication between computer devices using sound signals. Signal processing module 16 is preferably implemented in software on one or more computer devices (e.g., 12 and 14). Signal processing module 16 includes all the functionality for processing or transferring information acoustically between computers.

It is to be understood that the information transferred acoustically between computers in accordance with this disclosure functions as any other data or command information transferred by other methods and protocols. This means, for example, that data may be transferred or commands issued from one machine to another.

The receiver computer 12 translates a sound signal 10 into voltage using a microphone or other pressure transducer device 13 and an audio front-end, and then samples the resulting voltage to obtain a digital signal in block 17.

The digital signal preferably includes samples of a modulated signal that a transmitter, say transmitter computer 14 (or transceiver computer 15) has transmitted. The digital modulated signal is then passed to a demodulator 20 that extracts the originally transmitted data.

The transmitter computer 14 modulates the original data and creates a modulated digital signal using a modulation module 21. It then passes the modulated digital signal to a digital to analog converter 22. The resulting voltage is then passed to a loudspeaker and/or an acoustic subsystem 24 that translates the voltage into a sound wave(s) 26.

Any computer singly or in a network may be equipped with both functionalities of receiver computer 12 and transmitter computer 14. In addition, a transceiver 15 is an optional component that permits the creation of ad-hoc higher range networks by propagating sound signals, preferably without translating or demodulating the signal. Any input sound signal that is intercepted by the transmitter 15 is digitized and reconverted to voltage and played back using the loudspeaker 24. The transceiver does not need to perform any demodulation, and acts as a repeater.

The demodulation component 20 in the receiver computer 12 may also include some signal detection functionality 32 to discover that the modulation component in the receiver has initiated transmission. This may be implemented, for example, by having the transmitter play a specific frequency to indicate the start of communication (a pilot signal 23), and having the demodulation component 20 detect that a pilot signal has been transmitted.

Figure 2:
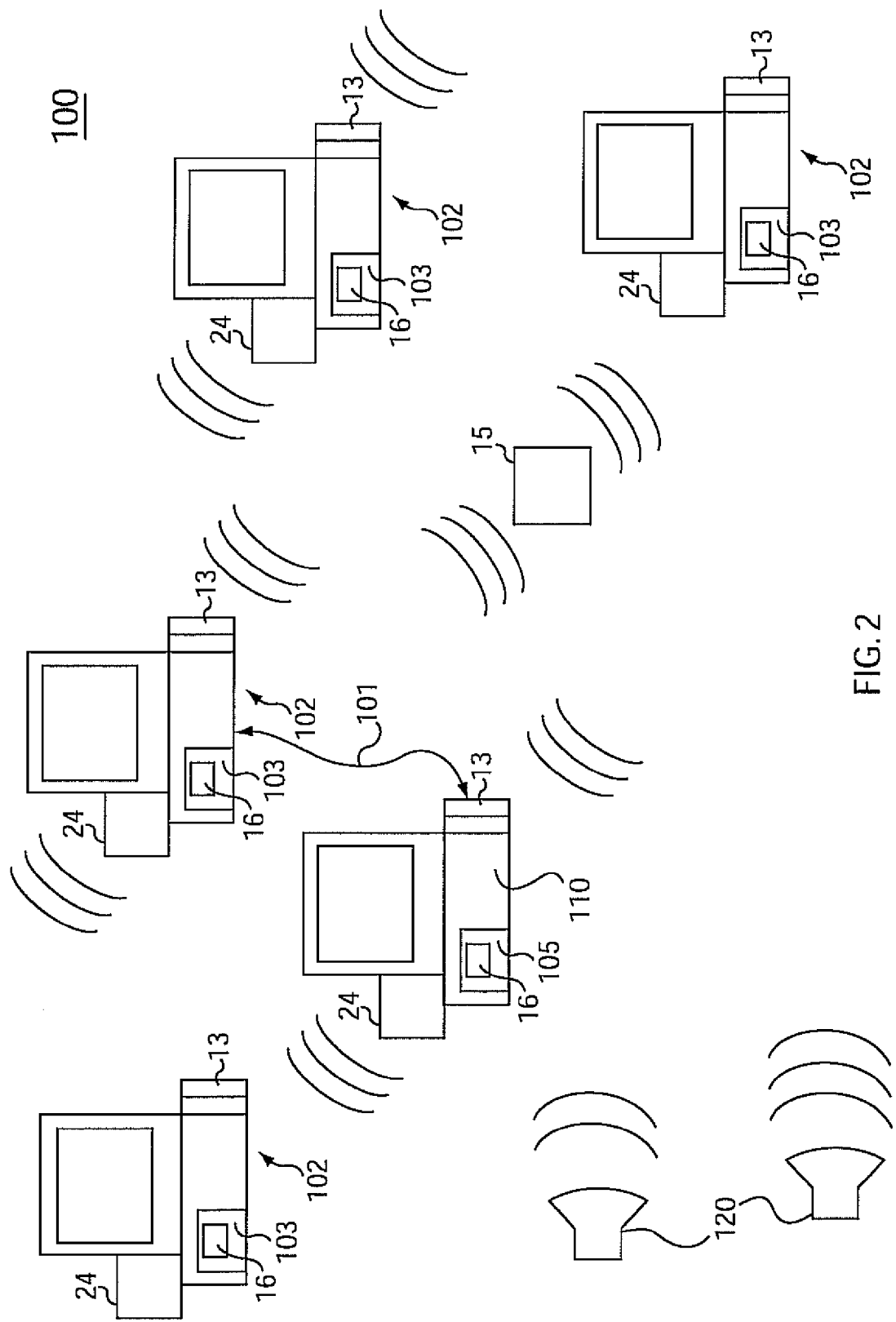
FIG. 2 is a diagram showing an acoustic communication network in accordance with the present disclosure.

Referring to FIG. 2, a network 100 includes a plurality of computers 102, each having a software package for implementing the aspects and features described with reference to FIG. 1. Computers 102 may be networked by wired or wireless connections. In addition, computers 102 may be able to audibly communicate in accordance with this disclosure.

Network 100 may be set up to communicate using different modes of communication. In one embodiment, the network 100 may use, for example, a wired network 101 for day-to-day peer-to-peer communications. However, in the event that this network goes down, audible communication may be employed. In addition, the network 100 may include computers, which are receivers, which are transmitters and those that are both. These computers may communicate some or all information acoustically while communicating other information by other methods (cables, IR, RF, etc.).

Having computers interact by means of an existing audio system has a plurality of uses. For example, in a partial malfunction where a computer looses normal network connection capability, the sound communication subsystem may be used to send (and potentially also propagate) important diagnostic information. In some cases an administrator machine or master computer 110 may audibly send back a software patch to a malfunctioning computer or computers, allowing it/them to recover.

In other embodiments, sound communication can be used to backup important data. Computers 102 may communicate by sound to a back-up device or master computer 110 to send stored information thereto for archiving from computer memory 103 to archive memory 105. This function may be active at anytime, but would be preferably useful during inactivity periods such as overnight or other times when a user is not employing the sound system of the computer. The backup function would be particularly useful, during an emergency when the network malfunctions. For example, when a computer virus is discovered to infect computers that are connected in a network, a system administrator can choose to shut down the network, then she/he can transmit a check sequence or a virus-fix using sound to all the computers (that will also propagate the check sequence to neighboring computers to make sure that all machines are updated).

Sound may also be used to indicate to all the computers 102 in the network that they may start initiating communication with servers over the network 100 once the emergency conditions are over. For the purpose of broadcasting the same message to many computers, an existing paging system or sound system 120 can be used. In this way, sound may be used as a trigger to release computers from a protected or dormant state before, during or after an emergency situation.

Another use for audio broadcast may include notification of an emergency or other event when a network is down. For example, if a fire starts near network equipment and the network is down, a neighboring computer that is also equipped with a smoke detector may start transmitting, using its sound system, a fire emergency message. Neighboring computers that intercept this message will propagate it until a central site-control location intercepts the message resulting in the activation of the fire alarm and timely dispatch of fire fighters.

Sound generated by transmitters may be in a frequency range audible by humans (e.g., 0 Hz to about 20,000 Hz) or be in a range, which cannot be heard be humans. Although most audio hardware has a dynamic range focused on the human perceivable frequency range, these limits may be exceeded to provide computer communication, which cannot be heard by humans.

Since audio waves are omni-directional they may also be used to broadcast short-range business promotional information. For example, a store may install a loudspeaker or siren (120) outside its front door, and have the store computer transmit discount coupons that will be intercepted by Personal Digital Assistants (PDA's) (102) in the vicinity of the store.

In other embodiments, the audio system of the present disclosure may provide a means for locating equipment or computers. For example, in a hospital or other facility, transceivers may be employed and installed throughout the hospital or facility such that an audible signal can be sent to determine where personal are, where equipment is located, etc. This may be based on sound sent back to the transceivers located throughout the facility or by other means.

In systems having a plurality of computers, the computers may transmit and receive signals simultaneously. Since the computer recognizes the signal it is sending, these signals may be filtered out from the received signals. In addition, pilot signals may be sent out to determine "voices" of other computers. These "voices" can then be employed in conversations where multiple computers converse simultaneously. Any known multiplexing method such as Time Division Multiplexing, Frequency Division Multiplexing, and Code Division Multiplexing can be used to permit multiple communications to coexist in a same channel or channels.

As shown in FIG. 2, one or more transceivers 15 may be employed as repeaters. These transceivers 15 may be a standalone device having the function of boosting the sound waves it intercepts. Transceivers 15 may be implemented as a computer (e.g., transceiver 30 in FIG. 1) or include all the functionality as shown for transceiver 30, but using a different device.

Figure 3:
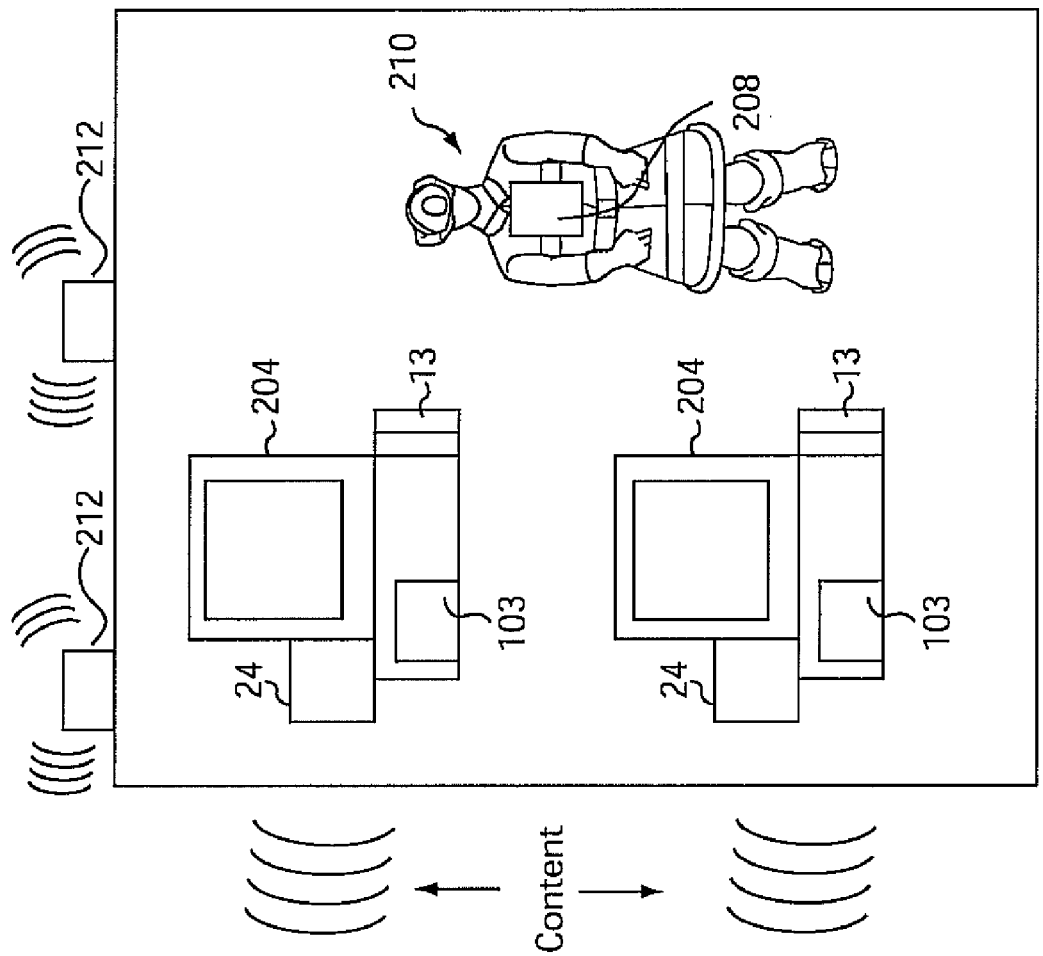
FIG. 3 is a diagram showing applications of an acoustic communication network in accordance with the present disclosure.
Figure 3:
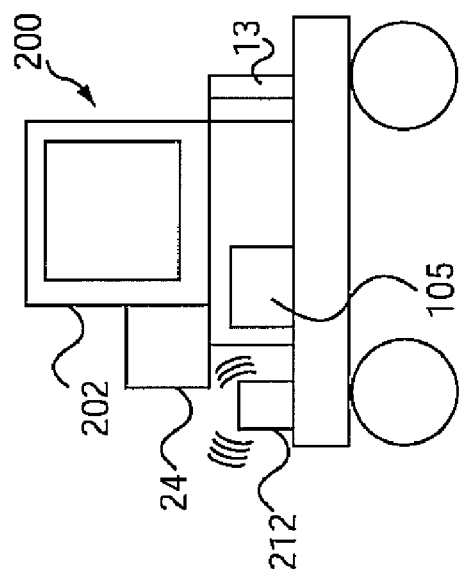

Referring to FIG. 3, an emergency back-up system 200 includes a computer unit 202. This unit 200 may be mobile or fixed. In case of an emergency or other event, unit 200 may trigger a response for other nearby (within an acoustic range or area) computers 204 to report their status or dump predesignated data or other stored data to computer device 202. For example, in an emergency event, such as a building fire, computers are left behind.

When a message about an emergency event is issued, a special service machine or unit 200 is deployed. Unit 200 may be part of a network in place or be deployed during the event to get the information in nonstandard media, like sounds, infrared, screen emission, ability to create local virtual network etc. Service machine 202 may move close to a building 201 where the emergency occurs to be able to catch signals from computers therein which may be in jeopardy of being destroyed. For example, computers in the emergency building can shout to this machine their content and unit 202 records this content.

Computers 204 may be alerted by unit 202 or by other means, is for example, fire alarms or other sounds lights or signals. In another embodiment, firefighters or other personnel 210 may be equipped with special recording devices 208. When they come in rooms under fire, computers can "shout" important contents or data prior to being destroyed.

In another embodiment, back-up services may be provided for computers having the ability to communicate wirelessly by acoustic waves. These back-up resources may be requested by a computer when, for example, the amount of needed resources exceed the existing local back-up means. Then, back-up services are called up to add resources, and these back-up resources can be provided via non-standard media means (e.g. via audio).

Back-up services may include a network of computers with the capabilities of service machine 202. These machines may be distributed over an area and receive sound from computers 204 to provide back-up services when needed. This service may be a subscriber service and may be a pay service. Payment may be made based on one or more of number of accesses of the back-up service, number of computers serviced, amount of storage space used, emergency usage, etc.

Entities that provide emergency sirens may extend their service to play data encoded in sound using sirens 212. Dedicated listener software in homes and control centers can decode the data encoded in the siren sound and take action (e.g. display appropriate messages, contact police/fire department, etc.). For example, a siren may be sounded and include encoded information. A person or persons in the area with a telephone, PDA or other device (for example set top boxes or even a specially designed decoder unit) can decode the sound to receive a message. The message may, for example, describe the emergency and its location, describe a weather condition, e.g., a tornado, or any other event.

An alert system may include a siren 212 or network of sirens, which acoustically transmits encoded digital information when activated. This information may include a sound signal in addition to the encoded sound signal.

The siren may be disposed at an arbitrary location, like on top of a building or utility pole, or be portable, for example, incorporated in an emergency vehicle's siren. The digital information is received by one or more distributed computer devices within an audible range of the siren to determine a message provided in the encoded digital information. The message may be translated into text, sound, or any other format by a user's computer device.

It is to be understood that the present disclosure may employ different hardware systems, for example transducers, microphones, speakers etc. for transmitters, receivers, and transceivers. These devices may be designed and manufactured by different vendors, and may include separate protocols or standards or may obey a single standard(s) specifying the coding and detection scheme for sound-based computer communication. In addition, any known multiplexing method such as Time Division Multiplexing, Frequency Division Multiplexing, and Code Division Multiplexing can be used to permit multiple communications to coexist in a same channel or multiple channels.

Having described preferred embodiments of a method and apparatus for computer communication using audio signals (which are intended to be illustrative and not limiting), it is noted that modifications and variations can be made by persons skilled in the art in light of the above teachings. It is therefore to be understood that changes may be made in the particular embodiments of the present disclosure which are within the scope and spirit of the disclosure as outlined by the appended claims. Having thus described exemplary embodiments with the details and particularity required by the patent laws, what is claimed and desired protected by Letters Patent is set forth in the appended claims.

What is claimed is:

1. An alert system, comprising:
a siren which acoustically transmits encoded digital information when activated, the siren being disposed at an arbitrary location; and
the digital information being received by one or more distributed computer devices within an audible range of the siren to determine a message provided in the encoded digital information, wherein the siren commands the one or more computer devices, responsive to the siren, to acoustically transmit stored data.

2. The alert system as recited in claim 1, wherein the distributed computer devices include a microphone to receive the audible signals.

3. The alert system as recited in claim 1, further comprising one or more transceiver devices for propagating the sound signals to remote computer devices outside of the audible range of the siren.

4. The alert system as recited in claim 1, wherein the siren commands the one or more distributed computer devices, responsive to the siren, to backup data.

5. The alert system as recited in claim 1, wherein the siren commands the one or more distributed computers devices to warn people in an area of an emergency situation.

6. An alert system, comprising:
- a siren which acoustically transmits encoded digital information when activated, the siren being disposed at an arbitrary location; and
- the digital information being received by one or more distributed computer devices within an audible range of the siren to determine a message provided in the encoded digital information, wherein the siren commands the one or more distributed computer devices, responsive to the siren, to backup data.

* * * * *